US010879712B2

(12) United States Patent
Kissel et al.

(10) Patent No.: US 10,879,712 B2
(45) Date of Patent: Dec. 29, 2020

(54) BATTERY ADAPTER

(71) Applicant: Ravenswood Solutions Inc., Fremont, CA (US)

(72) Inventors: Caleb Kissel, Fremont, CA (US); James Hansen, Fremont, CA (US)

(73) Assignee: Ravenswood Solutions Inc., Fremont, CA (US)

(*) Notice: Subject to any disclaimer, the term of this patent is extended or adjusted under 35 U.S.C. 154(b) by 146 days.

(21) Appl. No.: 16/271,814

(22) Filed: Feb. 9, 2019

(65) Prior Publication Data

US 2019/0252895 A1 Aug. 15, 2019

Related U.S. Application Data

(60) Provisional application No. 62/628,826, filed on Feb. 9, 2018.

(51) Int. Cl.
*H02J 7/00* (2006.01)
(52) U.S. Cl.
CPC .......... *H02J 7/0045* (2013.01); *H02J 7/0021* (2013.01); *H02J 7/0027* (2013.01)
(58) Field of Classification Search
CPC .................................................. H02J 7/0045
USPC ......................................................... 320/107
See application file for complete search history.

(56) References Cited

U.S. PATENT DOCUMENTS

| 6,459,176 B1* | 10/2002 | Brockel | H01M 2/105 |
| | | | 307/150 |
| 2008/0090452 A1* | 4/2008 | Rose | H01R 43/00 |
| | | | 439/500 |
| 2011/0198103 A1* | 8/2011 | Suzuki | B25F 5/00 |
| | | | 173/46 |
| 2013/0025893 A1* | 1/2013 | Ota | H02J 7/0045 |
| | | | 173/2 |
| 2013/0062955 A1* | 3/2013 | Suzuki | H02J 7/0014 |
| | | | 307/77 |

* cited by examiner

*Primary Examiner* — Jerry D Robbins
(74) *Attorney, Agent, or Firm* — Morgan, Lewis & Bockius LLP

(57) ABSTRACT

An adapter device for coupling one or more batteries to a remote powered device is provided. The adapter device includes a housing that accommodates a portion of a locking mechanism and a power system. The locking mechanism couples the one or more batteries to the adapter device. The power system facilitates power transfer between the one or more batteries and the remote powered device.

9 Claims, 6 Drawing Sheets

BATTERY ADAPTER

RELATED APPLICATION

This application claims priority to U.S. Patent Application Ser. No. 62/628,826, entitled "Battery Adapter," filed Feb. 9, 2018, which is hereby incorporated by reference in its entirety.

TECHNICAL FIELD

The present disclosure relates generally to battery adapters for coupling batteries to a powered device.

BACKGROUND

Theatres of war have evolved into a digital battlefield. Previous combatants depended on sufficient food, water, and ammunition for their survival, while modem combatants also require sufficient energy to power the electronics carried into theatre. These modern combatants rely on radio communication systems, navigation systems, electronic gun sights, and night vision systems, to name a few, which require energy to operate. Thus, the modern combatant must not only carry the above systems and devices but also sufficient energy to power these systems and devices.

Conventionally, a modern combatant will carry multiple discrete batteries on a mission. Throughout the mission, the combatant may fully deplete some batteries, partially depleted other batteries, while leaving the remaining batteries unconsumed. These partially depleted batteries and unconsumed batteries add excess weight to the load carried by the combatant, which depletes the personal energy of the combatant. Furthermore, the batteries used by combatants lock onto their respective powered devices with a rotating motion. Each battery has an asymmetric elongated shape. If each battery is coupled to an adapter or remote device individually, a single battery may prevent another battery from being coupled to the adapter or the remote device since the single battery occupies a large volume of solid when revolved.

Given the above background, what is needed in the art are systems and devices that enable a powered device to draw power from more than one battery. In particular, there is a need for enabling coupling more than one battery to a powered device using a battery adapter without consuming a large volume.

SUMMARY

The present disclosure addresses the above-identified shortcomings. Systems and devices are provided for coupling a plurality of batteries to a powered device. The device includes a first base. A first plurality of through holes is disposed on a planar surface of the first base. Further, each hole in the first plurality of through holes accommodates a respective locking mechanism. Each respective locking mechanism includes a first portion that is disposed on an external portion of the respective hole in the first plurality of holes. The first portion is also configured to be coupled with a respective battery in the plurality of batteries. A second portion of the locking mechanism is disposed on an internal portion of the respective hole in the first plurality of through holes. Further, the second portion is also configured to be coupled with a push rod. The device also includes a second base that is disposed below the first base. The second base includes a second plurality of through holes that is disposed on a planar surface of the second base. Each hole in the second plurality of through holes is aligned with a corresponding hole in the first plurality of through holes of the first base. Additionally, each hole in the second plurality of through holes is configured to accommodate a respective adapter. Each adapter facilitates power transfer from a respective battery in the plurality of batteries to the powered device. Further, the second base includes a groove that is disposed on a first side wall of the second based. The groove forms an opening portion at a portion of the first side wall. The groove also runs adjacent to each hole in the second plurality of through holes. Additionally, the groove is configured to accommodate the push rod. The device also includes a third base that is disposed below the second base. The third base includes a grounding mechanism that is disposed interposing the third base and the second base, and the grounding mechanism is in contact with each respective adapter. A power output mechanism is configured to be coupled to the powered device. The power output mechanism facilitates power transfer from the respective adapter of each battery in the plurality of batteries to the powered device. Further, the push rod moves between a first position and a second position. The first position configures the locking mechanism to couple a respective battery in the plurality of batteries to the device. The second position configures the locking mechanism to decouple the respective battery in the plurality of batteries from the device.

In some embodiments, the second base and the third base form a waterproof seal.

In some embodiments, for each respective locking mechanism, the first portion includes a blade. The blade includes a through hole that is disposed in a center portion thereof. The through hole of the blade is configured to expose a first end portion of a respective adapter. The blade also includes one or more protrusions on an outer edge portion of the blade. Each of the one or more protrusions is configured to removably interlock with a corresponding mating portion of a respective battery.

In some embodiments, for each respective locking mechanism, the second portion includes a rotor. The rotor includes a through hole that is disposed in a center portion thereof. The through hole of the rotor is configured to accommodate a respective adapter. A mechanism to couple the rotor to the push rod is disposed at an outer end portion of the rotor.

In some embodiments, for each hole in the second plurality of through holes of the second base, the second base includes a respective ball nose spring. A portion of the locking mechanism, a portion of the housing, and/or a portion of the power system of the device compresses the ball nose spring, which completes a path of electrical communication from a respective battery through a respective adapter to the powered device.

In some embodiments, the present disclosure provides an adapter device for coupling one or more batteries to a remote device. The adapter device includes a housing, a locking mechanism, and a power system. A first portion of the locking mechanism is partially disposed on an interior portion of the housing, and a second portion of the locking mechanism is partially disposed on an exterior portion of the housing. The locking mechanism is configured to couple with the one or more batteries simultaneously. The power system couples the one or more batteries in parallel and facilitates power transfer between the one or more batteries and the remote powered device.

In some embodiments, the present disclosure provides yet another adapter device for coupling two or more batteries to a remote device. The adapter device includes a locking mechanism that includes a respective blade for each respective battery. The battery is coupled to the adapter device via a rotating mechanism of each respective blade that is provided by an actuator and a rotor coupled to the respective blade. Each blade of the locking mechanism rotates in unison upon a motion of the actuator. Thus, multiple batteries are coupled and/or decoupled from the adapter device in unison.

In some embodiments, the present discloses yet another battery adapter device for coupling a plurality of batteries to a remote device. The adapter device includes a housing, a locking mechanism, and a power system. The locking mechanism includes a first portion that is partially disposed on an exterior portion of the housing and a second portion. Further, the first portion is configured to removably couple with a respective battery in the plurality of batteries. The locking mechanism also includes a second portion that is partially disposed in an interior portion of the housing. The second portion is configured to actuate a state of the locking mechanism. The power system facilitates power transfer between each battery in the plurality of batteries and the remote device.

In some embodiments, the housing includes a portion that is sealed from an external environment.

In some embodiments, the first portion of the locking mechanism includes one or more blades is configured to removably couple with a respective battery in the plurality of batteries.

In some embodiments, the second portion of the locking mechanism comprises an actuator that provides alters a state of the locking between a first state that decouples the battery adapter device from each respective battery in the plurality of batteries and a second state that couples the battery adapter device to each respective battery in the plurality of batteries.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DESCRIPTION OF EMBODIMENTS

Figure 1:
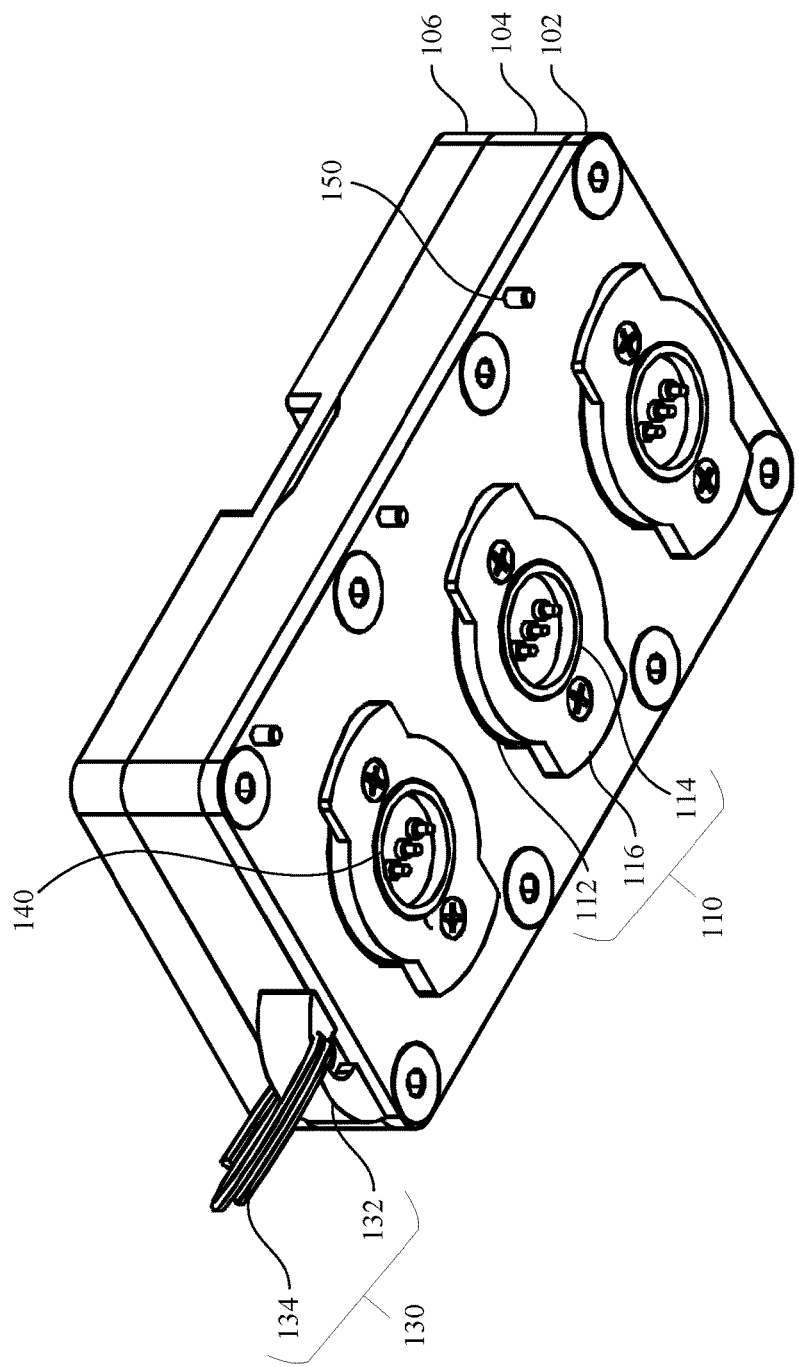
FIG. 1 illustrates a bottom view of an exemplary battery adapter in a coupled state, in accordance with an embodiment of the present disclosure.
Figure 2:
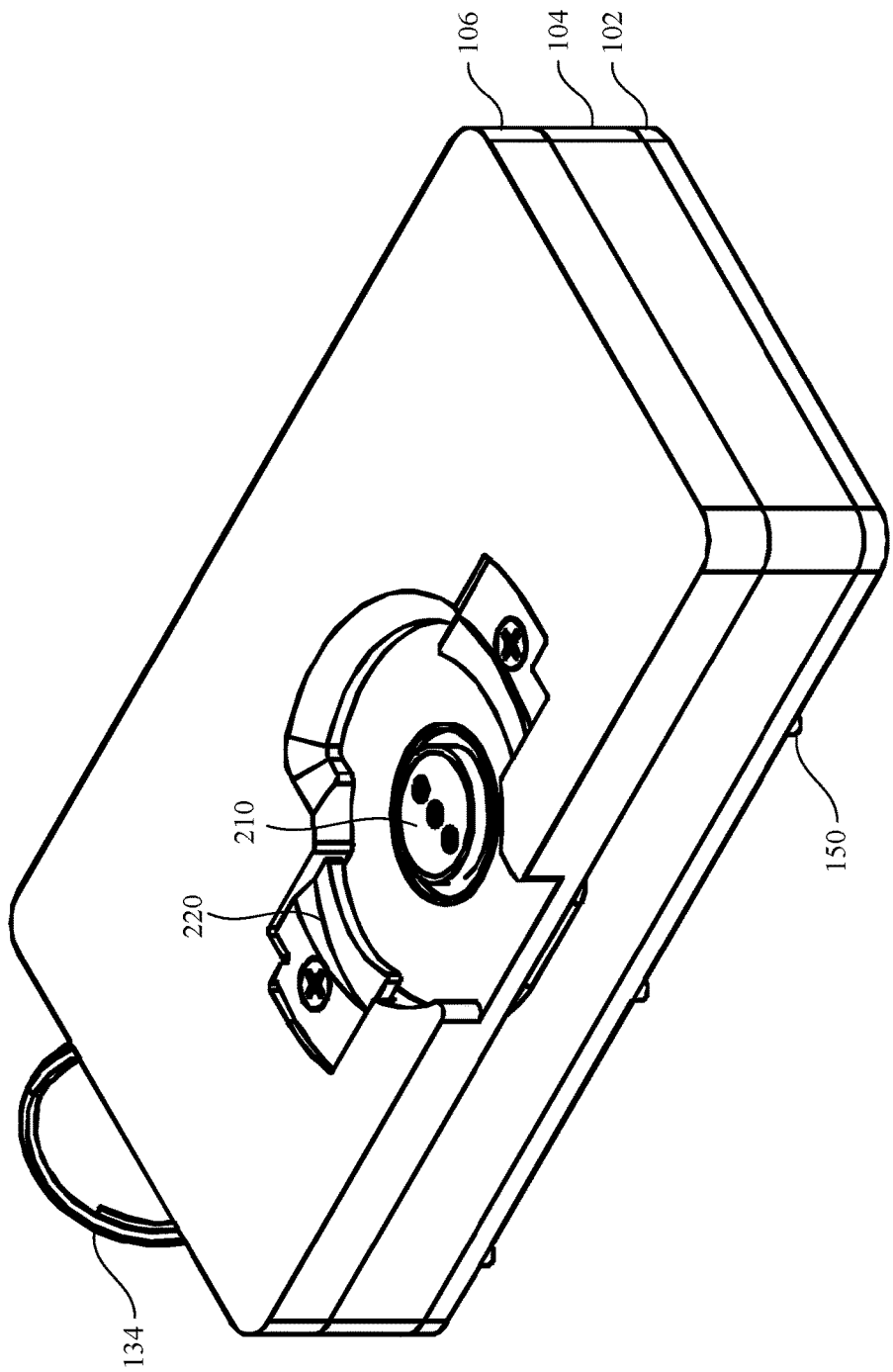
FIG. 2 illustrates a top view of an exemplary battery adapter in a coupled state, in accordance with an embodiment of the present disclosure.

The present disclosure provides systems and devices for coupling one or more batteries to a remote powered device. Remote powered devices require specific batteries that are substantially elongated and lock onto the powered device via a rotating locking mechanism and motion. The motion forces the battery to rotate from a first position to a second position, which leaves the battery prone to abutting adjacent objects since the battery is elongated. Moreover, these devices are designed to accommodate a single battery. Since these devices are designed for remote, hazardous conditions a single battery does not always supply sufficient energy. Because the remote powered devices require a substantial capacity of energy and a small volume, an adapter is required that allows an end user to couple one or more batteries to the remote powered device.

Accordingly, the present disclosure provides battery adapter systems and devices that allow for a secure (e.g., is not prone to being decoupled inadvertently) and compact (e.g., occupies a small volume) coupling of multiple batteries (e.g., multiple multiband inter/intra team radio (MBITR) batteries) via a rotating lock mechanism. The rotating lock mechanism allows for the multiple batteries to be coupled to a battery adapter device in unison, instead of individually rotated since individually rotating each battery increases a distance between batteries, which results in a larger adapter.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

Plural instances may be provided for components, operations or structures described herein as a single instance. Finally, boundaries between various components, operations, and data stores are somewhat arbitrary, and particular operations are illustrated in the context of specific illustrative configurations. Other forms of functionality are envisioned and may fall within the scope of the implementation (s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation (s).

It will also be understood that, although the terms "first," "second," etc. may be used herein to describe various elements, these elements should not be limited by these terms. These terms are only used to distinguish one element from another. For example, a first battery could be termed a second battery, and, similarly, a second battery could be termed a first battery, without departing from the scope of the present disclosure. The first battery and the second battery are both batteries, but they are not the same battery.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description included example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

For convenience in explanation and accurate definition in the appended claims, the terms "upper," "lower," "up," "down," "upwards," "downwards," "laterally, "longitudinally," "inner," "outer," "inside," "outside," "inwardly," "outwardly," "interior," "exterior," "front," "rear," "back," "forwards," and "backwards" are used to describe features of the exemplary embodiments with reference to the positions of such features as displayed in the figures.

In general, the present disclosure provides systems and devices for coupling one or more batteries to a remote powered device. A battery adapter device, hereinafter an "adapter device," of the present disclosure includes a housing, a locking mechanism, and a power system. One or more batteries is locked onto the adapter device via the locking mechanism, which is at least partially housed in the housing, and the power system, which is also at least partially housed in the housing, facilitates power transfer between each battery and the remote device.

Referring to FIGS. 1, 2, 3, and 4, an exemplary battery adapter device 100 is illustrated. The adapter device 100 is configured to couple one or more batteries (e.g., battery 500 of FIG. 5) in parallel to a remote device. Each adapter device 100 includes a housing that accommodates one or more components of the present disclosure, a locking mechanism 110 for each respective battery 500 in order to couples the adapter device 100 to the respective battery, and a power system 140 that facilitates power transfer between the respective battery and the remote device.

Figure 3:
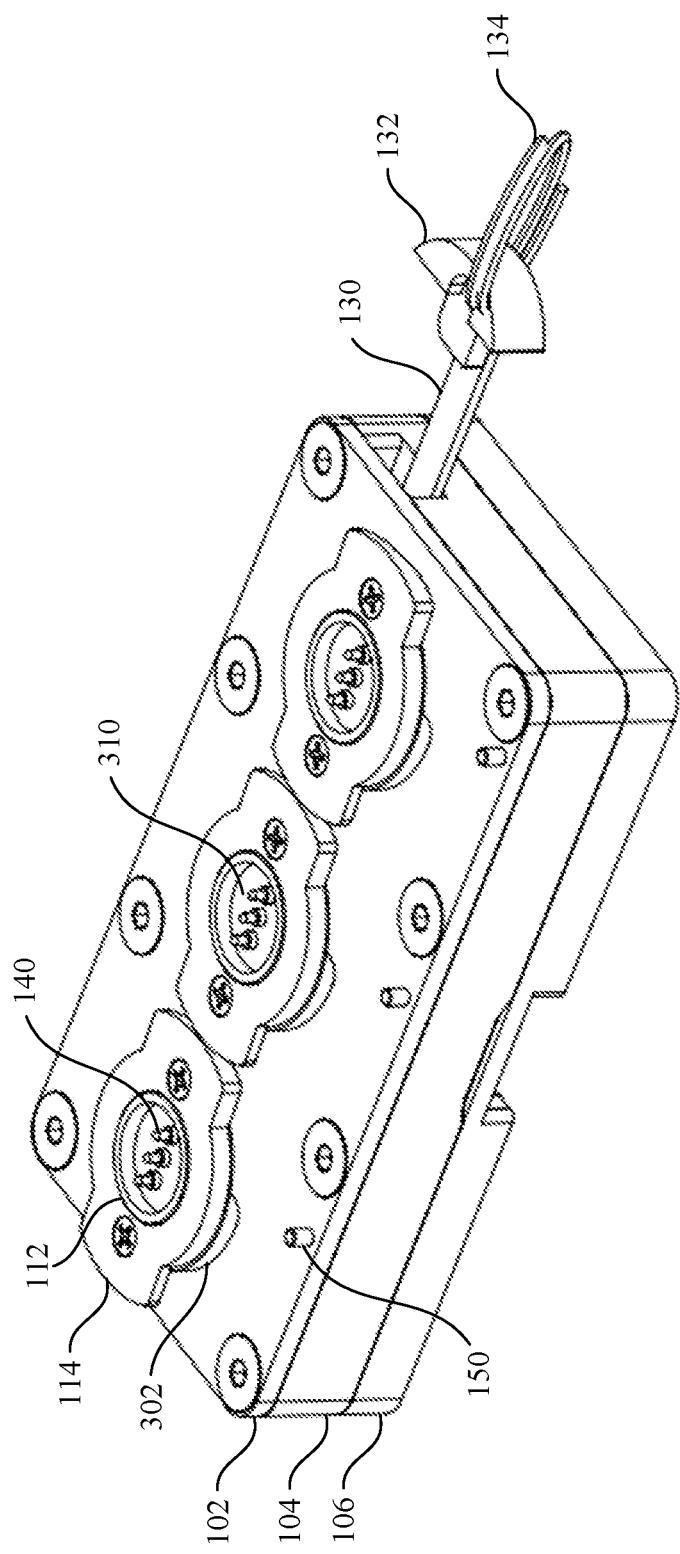
FIG. 3 illustrates a bottom view of an exemplary battery adapter in an uncoupled state, in accordance with an embodiment of the present disclosure.
Figure 4:
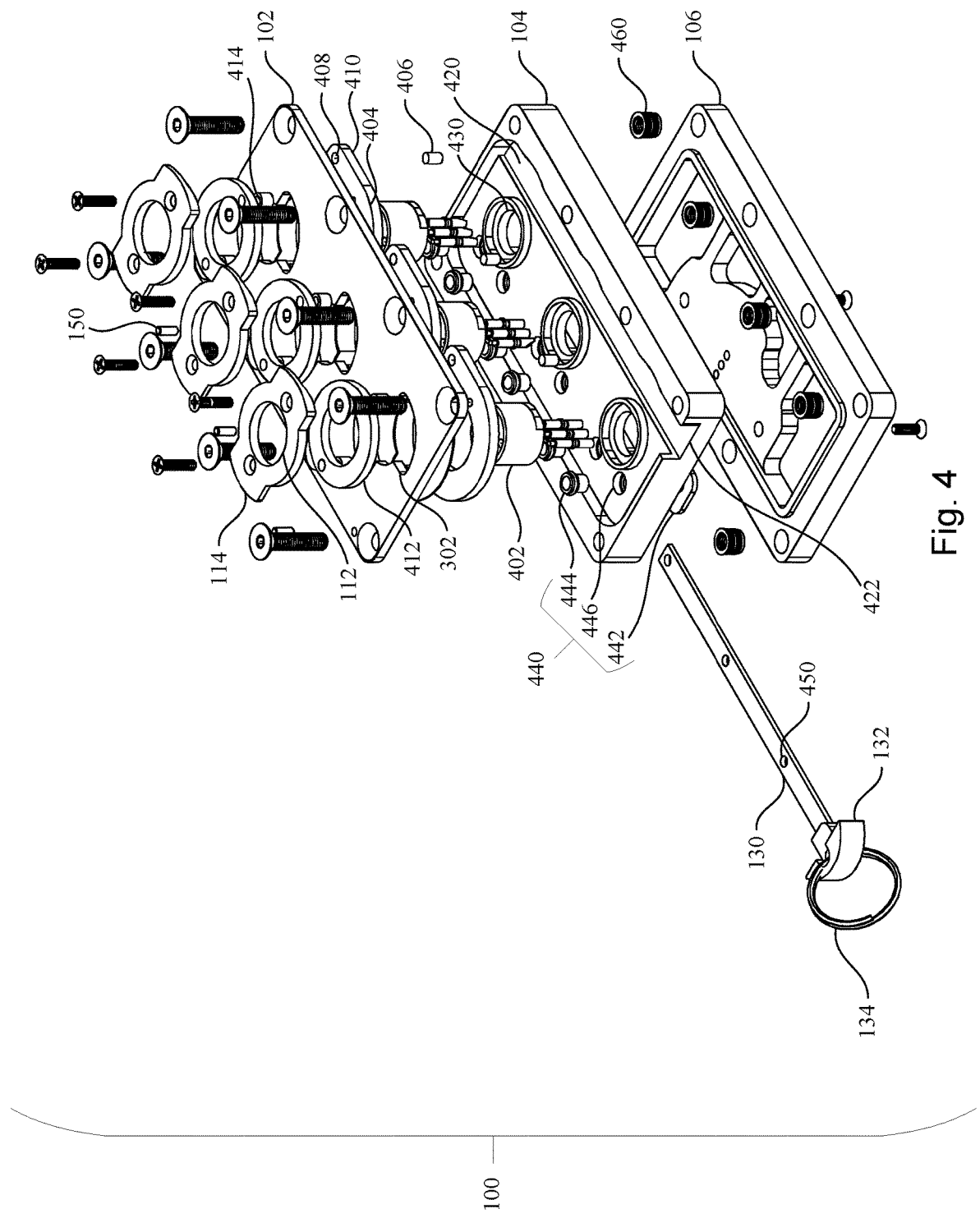
FIG. 4 illustrates an exploded view of an exemplary battery adapter, in accordance with an embodiment of the present disclosure.
Figure 6:
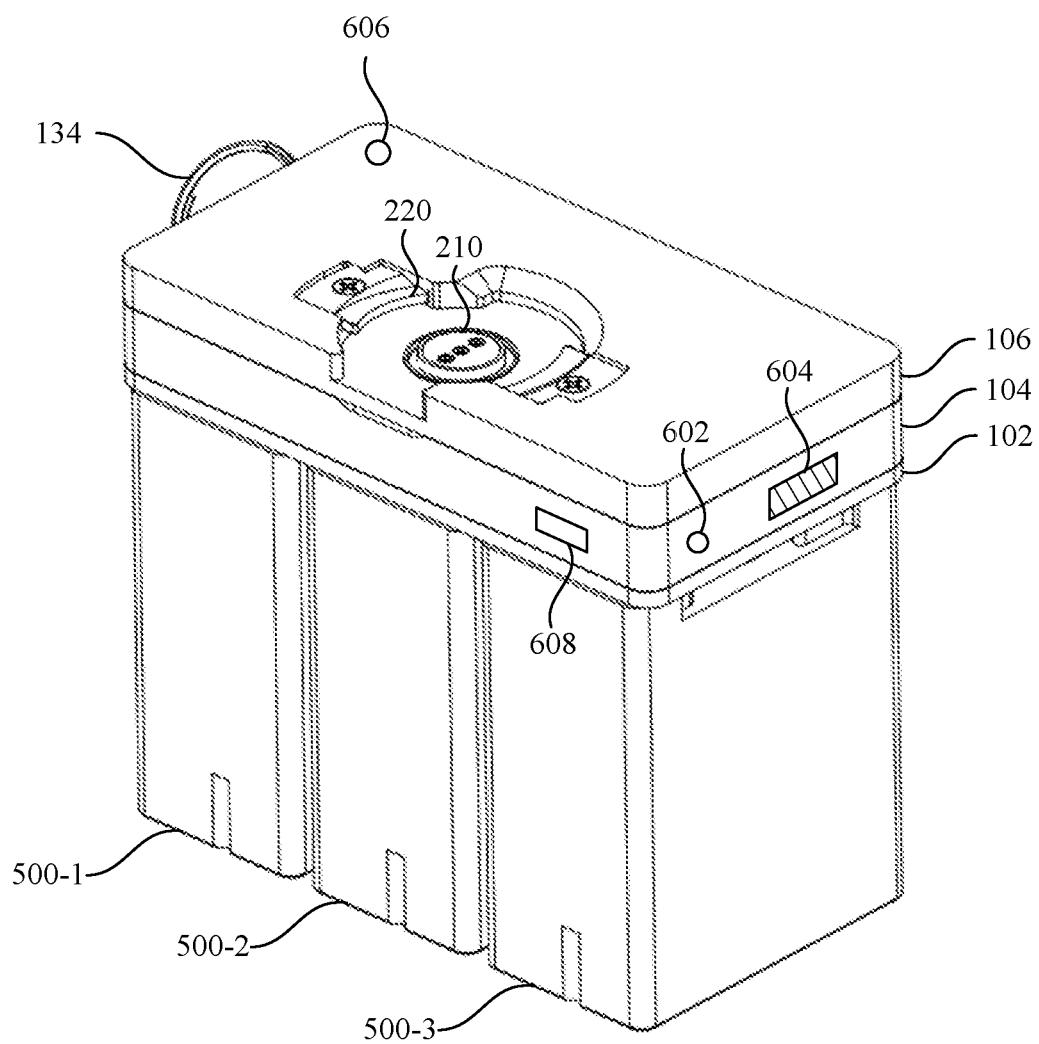
FIG. 6 illustrates an exemplary battery adapter coupled to a plurality of batteries, in accordance with an embodiment of the present disclosure.

In some embodiments, the housing of the adapter device 100 includes a first base 102, a second base 104 that is disposed below the first base, and a third base 106 that is disposed below the second base. In some embodiments, the first base 102 is removably coupled to the second base 104. In some embodiments, the second base 102 is removably coupled to the third base 106. In some embodiments, the first base 102, the second base 104, and the third base 106 are coupled together through one mechanism (e.g., a screw). The first base 102 is configured to accommodate a portion of the locking mechanism 110. The second base 104 is configured to interpose the first base 102 and the third base 106, thereby coupling the third base to the first base while also keeping the first base and the third base physically separated. In some embodiments, the locking mechanism includes a first portion (e.g., a blade 112) that is partially disposed on an exterior portion of the first base 102 (e.g., a portion opposing the second base 106), and a second portion (e.g., an actuator 130) that is partially disposed on an interior portion of the first base (e.g., a portion proximate to the second base 106). Accordingly, in some embodiments the first base 102 includes one or more holes (e.g., hole 302 of FIG. 3), that allows for the locking mechanism 110 to be disposed therethrough, while also reducing a weight of the adapter device 100. The locking mechanism 110 is configured to include a first state (e.g., an unlocked state, a decoupled state, a state as illustrated in FIG. 3 etc.) and a second state (e.g., a locked state, a coupled state, a state as illustrated in FIGS. 1 and 6, etc.). In some embodiments, the locking mechanism 110 includes an actuator 130 that facilitates altering a present state of the locking mechanism (e.g., from a first state to a second state, from the second state to the first state, etc.).

In some embodiments, the actuator 130 includes a push rod, a rack and pinion, a pneumatic cylinder, or a similar mechanism. In some embodiments, the 130 actuator is mechanically engaged by an end user of the adapter device 100. For instance, in some embodiments an end user of the device manually operates the actuator 130 (e.g., pushes and/or pulls a push rod, rotates a pinion or a mechanism coupled to the pinion, etc.). In some embodiments, the actuator 130 includes a grip 132 that allows for the end user of device to manipulate a state of the adapter device 100 with improved speed and/or comfort. For instance, in some embodiments the actuator 130 and/or the grip 132 includes a tab 134 which is configured to further improve an ability of the end user to manipulate a state of the adapter device 100. In some embodiments, the tab 134 is a ring (e.g., ring 134 of FIG. 1), in some embodiments the tab is a protrusion that extends from the actuator 130 and/or the grip 132. However, the present disclosure is not limited thereto. In some embodiments, the actuator 130 is engaged by an electronic mechanism such as a motor (e.g., a DC motor) that in turn operates the actuator 130. Accordingly, in some embodiments the housing includes a power switch (e.g., power switch 608 of FIG. 6), such as a push button, a toggle, a switch, or similar mechanism. Nevertheless, in some embodiments (e.g., in which an adapter device 100 is configured to accommodate two or more batteries 500) the actuator 130 is configured to manipulate a state of each locking mechanism 110. This allows for each respective locking mechanism 100 to operate in unison. In some embodiments, without a unison motion, two or more batteries 500 cannot be coupled to a remote device since a first battery of the two or more batteries will block a second battery of the two or more batteries.

In some embodiments, the locking mechanism 110 includes a blade 112. The blade 112 is configured to engage with a respective battery 500 in order to removably couple the battery to the adapter device 100. In some embodiments, the engagement with a respective battery 500 is conducted via corresponding mating portions (e.g., blades and/or protrusions) of the respective battery and the adapter device 100. In some embodiments the, the engaging includes a rotating motion from the first state to the second state. For instance, in some embodiments, the blade 112 includes one or more protrusions 116 that is configured to engage a corresponding portion on the respective battery 500 (e.g., the one or more protrusions 116 are engaged with a corresponding protrusion on the battery in a first state to couple the battery to the adapter device, and disengaged with the corresponding protrusion in the second state). In some embodiments, the one or more protrusions 116 of the blade 112 include a sloped end portion in order to promote engagement with a corresponding protrusion on the respective battery 500. Since the blade 112 of the present disclosure rotate between a first state and a second state, the rotating allows for movement of a portion of the locking mechanism 100 relative to a respective battery 500 instead of rotating the respective battery relative to an adapter device 100.

In some embodiments, the blade 112 of the locking mechanism 110 includes a hole 114 that accommodates a power system 140 (e.g., power adapter 402 for FIG. 4) to facilitates power transfer between the respective battery 500 and the adapter device 100. Furthermore, in some embodiments the blade 112 is includes a metal material in order to facilitate grounding of the respective battery 500. In some embodiments, the locking mechanism 100 includes a bearing 412 that is disposed interposing between the blade 112 and the first base 102 in order to reduce friction there between. In some embodiments, the bearing 412 is coupled to the blade 112 (e.g., via a screw). Furthermore, in some embodiments the bearing 412 includes a plastic material. In some embodiments, the bearing 412 is a washer.

In some embodiments, the locking system 100 includes a rotor 404. In some embodiments, the rotor 404 is disposed on an internal portion of the first base 102 interposing the first base and the second base 104 and coupled to the actuator 130. In some embodiments, the rotor 404 is coupled to the locking system through the bearing 412 and/or the blade 112 (e.g., by a screw that couples the components via passing through a portion of a respective through hole 302 of the first base). Accordingly, in some embodiments the rotor 404 translates a linear motion of an actuator 130 (e.g., a motion along a longitudinal axis of the actuator 130) into a rotational motion (e.g., a rotational movement of the blades 112). In some embodiments, the rotor 404 is disposed surrounding an outer edge portion of a respective power adapter 402. Accordingly, in some embodiments the rotor 404 is decoupled from the respective power adapter 402. This decoupling of the respective power adapter 402 allows for the rotor 404 to rotate the blades 112, which in turn couples and/or decouples a respective battery 500, without rotating an orientation of a first end portion 310 of the respective power adapter 402. In some embodiments, the rotor 404 includes a pin 406 that extends outwardly at a first end portion thereof from a surface of the rotor and couples with the actuator 130 at a second end portion thereof. In some embodiments, the pin 406 is coupled proximate to the groove 420. In some embodiments, the pin 406 is permanently coupled to either the actuator 130 or the rotor 404. In some embodiments, the pin 406 is removably coupled to both of the actuator 130 and the rotor 404. Additionally, in some embodiments the actuator 130 includes one or more seats 450 that accommodate a respective pin 406. Similarly, in some embodiments the rotor 404 includes a seat 408 to accommodate the pin 406. Furthermore, in some embodiments the rotor 404 includes one or more protrusions 410 that are configured to alter a distance between the rotor and the actuator 130.

In some embodiments, the locking system 110 includes a spacer 414 that is disposed interposing a respective bearing 412 and rotor 404. In some embodiments, the spacer 414 is disposed interposing a respective blade 112 and rotor 404 (e.g., in embodiments that lack a bearing 412). In some embodiments, the spacer 414 is accommodated in a respective through hole 302 of the first base 102.

In some embodiments, the second base 104 includes the groove 420 that is configured to accommodate the actuator 130. In some embodiments, the groove 420 extends from a first side wall of the second base 104, which in turn forms an opening 422. In some embodiments, the opening 422 is configured to have an inlet that is flush (e.g., creates a seal) with a portion of the actuator 130. However, the present disclosure is not limited thereto. In some embodiments, the opening 422 is configured with an inlet that includes a gap between an edge portion of the opening 422 and the actuator 130. This gap allows for debris (e.g., dirty, water, etc.) that may accumulate between the first base 102 and the second 104 to escape from the adapter device 100. Additionally, in some embodiments, due to a simultaneous motion of the actuator 130 in both a lateral direction and a longitudinal direction, the opening 422 is configured to accommodate such lateral motion. Nevertheless, in some embodiments the opening 422 is configured to accommodate a portion of the grip 132. Furthermore, in some embodiments the groove 420 is disposed on adjacent to a first portion of the locking mechanism 110 and/or the power system 140 (e.g., a portion nearest a second side wall of the second base 104).

In some embodiments, the first base 102 includes one or more locator mechanisms 150 that are disposed on an external surface thereof. The locator mechanism 150 is configured to assist in aligning a respective battery 500 with a corresponding locking mechanism 110 in order to reduce an amount of time needed for an end user of the adapter device 100 to couple the respective battery. In some embodiments, the locator mechanism 150 includes a protrusion (e.g., a peg, a dowel, etc.) and/or a groove. In some embodiments, the first base 102 includes one locator mechanism 150. Thus, an end user of the adapter device 100 can utilize a first battery 500 that is coupled to the adapter device using the one locator mechanism 150, and align additional batteries based on the first battery. Additionally, locator mechanism 150 prevents movement/rotation of a respective battery 500 during the transition between locking states (e.g., between a first state and a second state). However, the present disclosure is not limited thereto. In some embodiments, the first base 102 includes a locator mechanism 150 for each respective locking mechanism 110.

Furthermore, in some embodiments the second base 104 includes a respective through hole 430 for each corresponding locking mechanism 110. In some embodiments, each respective through hole 430 of the second base 104 includes a protrusion that is configured to seat a first portion of a power adapter 402. In some embodiments, the through hole 430 and a second portion, and/or the first portion, of the power adapter 402 are configured to form a seal. Accordingly, the seal prevents various components of the adapter device 100, such as electrically charged components and/or circuits, from being damaged by a fluid in a situation in which the adapter device 100 is exposed to the fluid. Furthermore, in some embodiments each respective through hole 430 is formed to align with the corresponding through hole 302 of the first base (e.g., aligns about an axis that intersects an origin of each respective through hole). For instead, in some embodiments the one or more holes 430 of the second base and the one or more holes 302 of the first base are formed in a corresponding array (e.g., disposed in a linear array).

In some embodiments, the adapter device 100 (e.g., the power system 140) includes a grounding mechanism 440. In some embodiments, a portion (e.g., a rod 442) of the grounding mechanism 440 is disposed interposing between the second base 104 and the third base 106. In some embodiments, the grounding mechanism 440 is a rod 442 that includes a metal material. In some embodiments, the grounding mechanism 440 includes one or more ball nose springs 444 that are each coupled to the rod 442. In some embodiments, each ball nose spring 444 is accommodated in a seat 446. In some embodiments, the ball nose spring 444 is in a constant state of compression via one or more portions of the adapter device 100. In some embodiments, the one or more portions of the adapter device 100 that compress the ball nose spring 444 include the first base 102, the second base 104, the third base 106, the locking mechanism 110, the power assembly 140, or a combination thereof. In some embodiments, each ball nose spring 444 is configured between a compressed state and a relaxed state, which are controlled according to a position of the rotor 404. For instance, in some embodiments a portion of the rotor 404 compresses a respective ball nose spring 444 if the rotor is in the second position (e.g., a battery is coupled to the respective locking mechanism 110), and decompresses the respective ball nose spring 444 if the rotor is in the first position (e.g., the battery is decoupled from the respective locking mechanism). Furthermore, in some embodiments the compressing of the respective ball nose spring 444 via the rotor 404 completes a grounding circuit from the respective blade 112 of the locking mechanism 110 to rod 442. Thus, in some embodiments a grounding circuit is either completed or interrupted according to a state of one or more respective ball nose springs 444 since the grounding circuit is from a respective blade 112 and bearing 412 to the rotor 404 (e.g., via a screw). In some embodiments, the rod 442 is further coupled the locking mechanism 220 of third base, which in turn is optionally coupled to a corresponding locking mechanism 520 of a respective battery 500, thereby safely grounding the respective battery and the remote device through the adapter device 100.

In some embodiments, the third base 106 of the adapter device includes the power transfer mechanism 210 and the remote device locking mechanism 220. The power transfer system 210 facilitates power transfer between the remote device and the one or more batteries 500 (e.g., via one output used by each power adapter 402). In some embodiments, the locking mechanism 220 is as described with respect to (e.g., mimics) the locking mechanism of the battery 520. In some embodiments, the third base includes one or more heat inserts 460 that assist in coupling the bases (e.g., the first base 102, the second base 104, and/or the third base 106) together.

Figure 5:
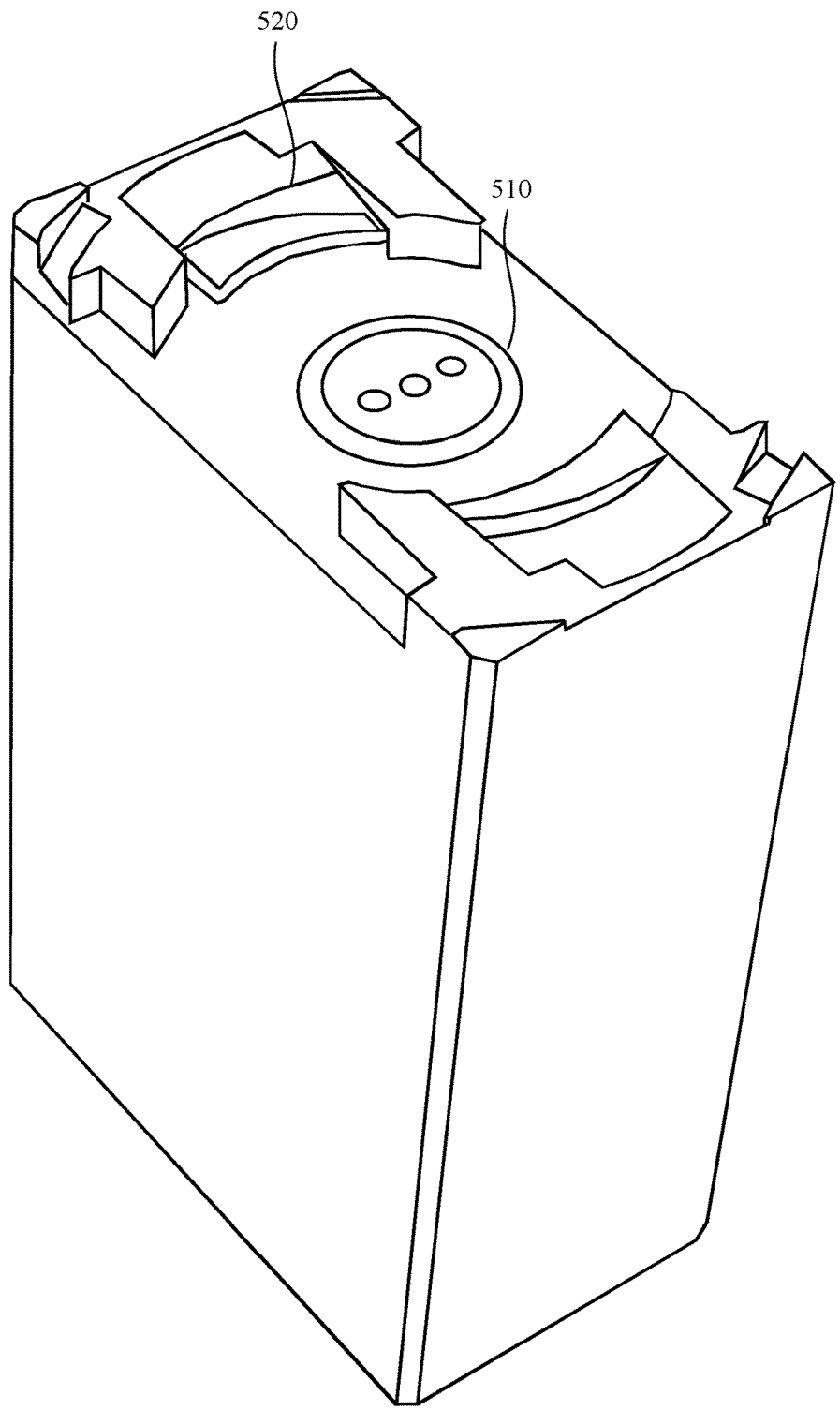
FIG. 5 illustrates an exemplary battery, in accordance with an embodiment of the present disclosure.

Referring to FIG. 5, an exemplary battery 500 is illustrated in accordance with an embodiment of the present disclosure. In some embodiments, each respective battery 500 includes a power transfer mechanism 510 that provides energy to the remote device and/or receives energy from the remote device. In some embodiments, the power transfer mechanism 510 of each respective battery 500 is as described with respect to a power adapter 402 of the adapter device 100 (e.g., the power adapter and the power transfer mechanism are a same type of device). In some embodiments, each respective battery 500 includes a locking mechanism 520 that couples the battery to the remote device and/or the adapter device 100. In some embodiments, the locking mechanism 520 of the battery 500 includes one or more blades that correspond to the one or more respective blades 112 of a respective locking mechanism 110 of the adapter device 100. In some embodiments the blades of the battery and the blades of the remote device have a same shape.

In some embodiments, the one or more batteries 500 include an AN/PRC-148 (e.g., AN/PRC-148 MBITR, AN/PRC-148 JEM) Rechargeable 6.8 Lithium-Ion Battery as provided by Thales Defense and Security, Inc., Clarksburg, Md., 20871. In some embodiments, the one or more batteries 500 include an AN/PRC-161 Rechargeable 6.8 Lithium-Ion Battery as provided by Thales Defense and Security, Inc., Clarksburg, Md., 20871. In some embodiments, the one or more batteries 500 have a watt hour rating of about 50 watthours (Wh). In some embodiments, the one or more batteries 500 have a watt hour rating of about 60 Wh. In some embodiments, the one or more batteries 500 have a watt hour rating of about 70 Wh. In some embodiments, the one or more batteries 500 have a watt hour rating of about 72 Wh. In some embodiments, the one or more batteries 500 have a watt hour rating of about 80 Wh. In some embodiments, the one or more batteries 500 have a watt hour rating of about 90 Wh. In some embodiments, the one or more batteries 500 have a height of about 3 in. In some embodiments, the one or more batteries 500 have a height of about 3.28 in. In some embodiments, the one or more batteries 500 have a height of about 4 in. In some embodiments, the one or more batteries 500 have a width of about 2 in. In some embodiments, the one or more batteries 500 have a width of about 2.63 in. In some embodiments, the one or more batteries 500 have a width of about 3 in. In some embodiments, the one or more batteries 500 have a depth of about 1 in. In some embodiments, the one or more batteries 500 have a depth of about 1.52 in. In some embodiments, the one or more batteries 500 have a depth of about 2 in. In some embodiments, the one or more batteries 500 have peak current of about 6 Amps (A). In some embodiments, the one or more batteries 500 have peak current of about 7 A. In some embodiments, the one or more batteries 500 have peak current of about 8 A. In some embodiments, the one or more batteries 500 have peak current of about 9 A. In some embodiments, the one or more batteries 500 have peak current of about 10 A. In some embodiments, the power system 510 of the respective battery in the one or more batteries includes a special power adapter interface (SPAI). In some embodiments, the adapter device 100 includes two or more batteries 500 and the two or more batteries are coupled in series through the power system 140. In some embodiments, the adapter device 100 includes two or more batteries 500 and the two or more batteries are coupled in parallel through the power system 140. Connecting the two or more batteries 500 in parallel allows for an increased output capacity of the adapter device 100, whereas connecting the two more batteries 500 in series allows for an increased voltage of the adapter device 100. In some embodiments, each respective battery 500 includes a seat 530 that is configured to accommodate a respective locating mechanism 150 on the first base 102 of the adapter device 100. In some embodiments, the seat 530 of the respective battery 500 includes a groove and/or a ramp that guides a motion of the respective battery.

Referring to FIG. 6, in some embodiments the adapter device 100 includes a power indicator 602 that indicates a state of the adapter device (e.g., coupled and/or uncoupled). In some embodiments, the power indicator 602 is a light emitting diode (LED). In some embodiments, the power indicator 602 is disposed on the first base 102, the second base 104, the third base 106, or a combination thereof. In some embodiments, the adapter device 100 includes a charge indicator 604 that indicates a level of charge of the batteries 500 coupled to the adapter device. In some embodiments, the charge indicator 604 indicates an average level of charge of the one or more batteries 500. In some embodiments, there is a respective charge indicator 604 for each respective battery 500 coupled to the adapter device 500. In some embodiments, the charge indicator 604 and the power indicate 602 are subsumed as a single indicator (a light source is powered depending on a state of the adapter device 100 and/or emits a different color of light depending on a level of charge of one or more batteries 500. In some embodiments, the charge indicator 604 is disposed on the first base 102, the second base 104, the third base 106, or a combination thereof. In some embodiments, the adapter device 100 includes a power mechanism 606 that controls a flow of energy through the power system 140 of the device. In some embodiments, the power mechanism 606 is disposed on the first base 102, the second base 104, the third base 106, or a combination thereof. In some embodiments, the adapter device 100 includes one or more ports 608. In some embodiments, a respective port 608 in the one or more ports is a universal serial bus (USB) port that transfer power between a USB powered device and the one or more batteries 500. In some embodiments, a respective port 608 in the one or more ports is an alternating current (AC) outlet that allows for the one or more batteries 500 to be recharged through the adapter device 100. Furthermore, in some embodiments each respective power adapter 402 includes one or more mechanisms (e.g., pins) to facilitate power transfer and/or one or more mechanisms to facilitate data transfer (e.g., charge level).

While the figures of the present disclosure generally illustrate embodiments of an adapter device 100 that is configured to accommodate three batteries 500 and one remote device, the present disclosure is not limited thereto. For instance, in some embodiments an adapter device 100 is configured to accommodate at least four batteries 500. In some embodiments, the adapter device 100 is configured to accommodate at least five batteries 500. In some embodiments, the adapter device 100 is configured to accommodate at least six batteries 500. In some embodiments, the adapter device 100 is configured to accommodate at least nine batteries 500. In some embodiments, the adapter device 100 is configured to accommodate at least ten batteries 500. In some embodiments, the adapter device 100 is configured to accommodate at least twenty batteries 500. Furthermore, in some embodiments the batteries 500, and therefore the respective locking mechanisms of the adapter device 100) are arranged in a grid (e.g., a rectangular grid, a square grid, a circular grid, etc.). Additionally, in some embodiments the adapter device 100 includes one or more mechanism (e.g., power output 210 and locking mechanism 220) to couple to respective remote devices. For instance, in some embodiments the adapter device 100 is configured to couple to two or more remote devices. In some embodiments, the adapter device 100 is configured to couple to three or more remote devices. In some embodiments, the adapter device 100 is configured to couple to four or more remote devices. In some embodiments, the adapter device 100 is configured to couple to six or more remote devices. In some embodiments, the adapter device 100 is configured to couple to ten or more remote devices.

Accordingly, an adapter device of the present disclosure allows an end user to couple one or more batteries to a remote powered device with improved speed, comfort, and number of batteries capable of being coupled to the remote powered device. In some embodiments, the adapter device includes a first portion that includes various mechanical, moving components of the adapter device (e.g., a locking mechanism), and a second portion that includes various electrical components of the adapter device. Thus, in some embodiments the first portion of the adapter device (e.g., a region interposing the first base and the second base) is easily cleanable while the second portion of the adapter device (e.g., a region interposing the second base and the third base) is sealed from any contaminate of the first portion.

What is claimed is:

1. A device for coupling a plurality of batteries to a powered device, the device comprising:
 a first base comprising a first plurality of through holes disposed on a planar surface of the first base, wherein:
  each hole in the first plurality of through holes is configured to accommodate a respective locking mechanism, wherein each respective locking mechanism comprises:
   a first portion disposed on an external portion of the respective and configured to couple with a respective battery in the plurality of batteries, and
   a second portion disposed on an internal portion of the respective hole and configured to couple with a push rod;
 a second base disposed below the first base, the second base comprising:
  a second plurality of through holes disposed on a planar surface of the second base, wherein:
   each hole in the second plurality of through holes aligns with a corresponding hole in the first plurality of through holes of the first base, and
   each hole in the second plurality of through holes is configured to accommodate a respective adapter that facilitates power transfer from a respective battery in the plurality of batteries to the powered device, and
  a groove disposed on a first side wall, wherein the groove forms an opening at a portion of the first side wall and runs adjacent to each hole in the second plurality of holes, and wherein the groove is configured to accommodate the push rod; and
 a third base disposed below the second base, wherein the third base comprises:
  a grounding mechanism disposed interposing the third base and the second base, the grounding mechanism in contact with each respective adapter, and
  a power output mechanism configured couple to the powered device and facilitate power transfer from the respective adapter of each battery in the plurality of batteries to the powered device, wherein:
 the push rod moves between a first position that configures the locking mechanism to couple a respective battery in the plurality of batteries to the device and a second position that configures the locking mechanism to decouple the respective battery in the plurality of batteries from the device.

2. The device of claim 1, wherein the second base and the third base form a waterproof seal.

3. The device of claim 1, wherein for each respective locking mechanism:
the first portion comprises a blade comprising:
a through hole in a center portion thereof, the through hole of the blade configured to expose a first end portion of a respective adapter, and
one or more protrusions on an outer edge portion of the bade, the one or more protrusions configured to removably interlock with a portion of a respective battery.

4. The device of claim 3, wherein for each respective locking mechanism:
the second portion comprises a rotor, the rotor comprising:
a through hole in a center portion thereof, the through hole of the rotor configured to accommodate a respective adapter, and
a mechanism to couple the rotor to the push rod.

5. The device of claim 4, wherein for each hole in the second plurality of through holes of the second base, the second base comprises a respective ball nose spring, and wherein the first position of the push rod compresses the ball nose spring to complete a path of electrical communication from a respective battery through a respective adapter to the powered device, and the second position of the push rod releases the ball nose spring to interrupt the path of electrical communication.

6. A battery adapter device for coupling a plurality of batteries to a remote device, the adapter device comprising:
a housing;
a locking mechanism comprising:
a first portion that is partially disposed on an exterior portion of the housing, wherein the first portion is configured to removably couple with a respective battery in the plurality of batteries, and
a second portion that is partially disposed in an interior portion of the housing, wherein the second portion is configured to actuate a state of the locking mechanism; and
a power system that facilitates power transfer between each battery in the plurality of batteries and the remote device.

7. The battery adapter device of claim 6, wherein the housing includes a first portion that is sealed from an external environment.

8. The battery adapter device of claim 6, wherein the first portion of the locking mechanism includes one or more blades is configured to removably couple with a respective battery in the plurality of batteries.

9. The battery adapter device of claim 6, wherein the second portion of the locking mechanism comprises an actuator that provides alters a state of the locking between a first state that decouples the battery adapter device from each respective battery in the plurality of batteries and a second state that couples the battery adapter device to each respective battery in the plurality of batteries.

* * * * *